Aug. 4, 1931.     N. M. SMALL     1,817,853
VALVED PISTON
Filed Sept. 22, 1930

Inventor
Norman M. Small

By

Patented Aug. 4, 1931

1,817,853

UNITED STATES PATENT OFFICE

NORMAN M. SMALL, OF WAYNESBORO, PENNSYLVANIA, ASSIGNOR TO FRICK COMPANY, OF WAYNESBORO, PENNSYLVANIA, A CORPORATION OF PENNSYLVANIA

VALVED PISTON

Application filed September 22, 1930. Serial No. 483,691.

This invention relates to valves for pistons and is designed particularly with a view to its use in compressors for refrigerating machinery, although it may be used for any other type of compressor and is a continuation in part of my copending application Serial No. 287,284, filed June 21, 1928, for valves.

An object of the invention is to provide a valve which shall be positive in operation, noiseless, and easily removable from the piston.

Figure 1:
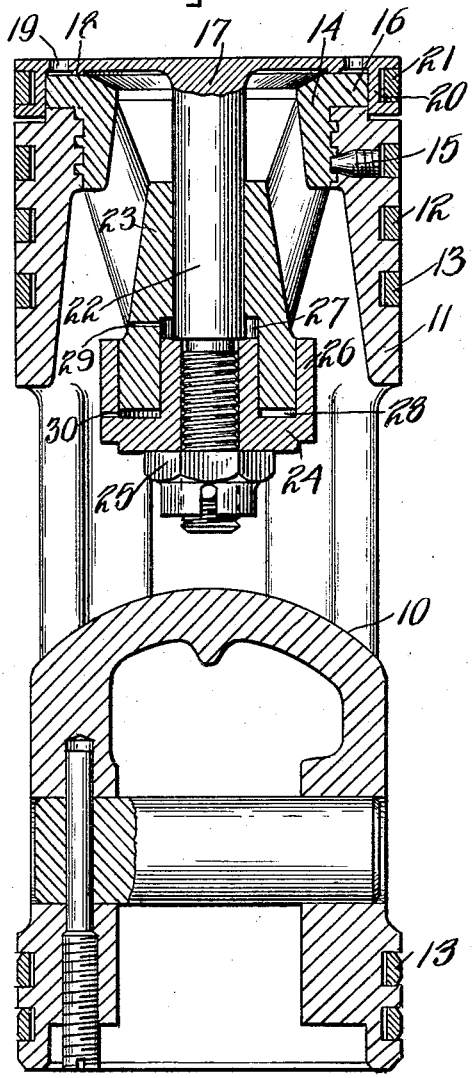
Figure 2:
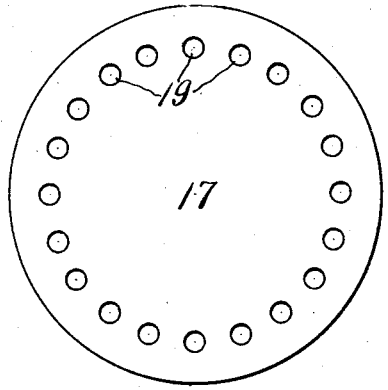

Referring to the accompanying drawings, which are made a part hereof and on which similar reference characters indicate similar parts, Figure 1 shows a sectional elevation of a compressor piston with my improved valve mounted thereon, and Figure 2 is a plan looking in the end of the piston.

In the drawings numeral 10 indicates a compressor piston of suitable construction having a head 11 and rings 12. Piston rings 13 may also be provided on the rear end of the piston in order to seal both ends of the piston against fluid leakage so that the body of the piston may travel in the medium to be pumped or compressed. A removable valve seat 14 is secured by means of threads in the end of the piston head and prevented from backing out by screw 15. An annular flange 16 on the valve seat rests on the outer end of the piston head 11. A valve 17 is provided with an annular ridge 18 which rests upon the top of the flange 16. An annular series of ports 19 is provided in the valve radially outward of the valve seat 18. The valve has a depending ring groove 20 made integral therewith in which is provided a piston ring 21. Secured to the valve is a stem 22 which is mounted to slide axially in a bore in a spider 23 formed integral with valve seat 14. The stem carries a cap 24 secured thereon by a nut 25. The cap 24 is provided with an outer flange 26 which fits over an annular portion of the spider 23, so as to provide fluid chambers 27 and 28. These chambers may be provided with ports 29 and 30. The chambers 27 and 28 together with the restricted ports 29 and 30 provide cushioning means for the valve 17. The cushioning of the valve, as indicated, eliminates all noise or clicking such as sometimes occurs, particularly with large compressors.

In operation, on the suction stroke the packing ring 21 frictionally engages the inner surface of the cylinder and lifts the valve 17 from its seat on the head of the piston. Fluid therefore may enter the cylinder around the annular shoulder 18 and through the ports 19. Upon the compression stroke the valve 17 is moved to its seat so that the shoulder 18 engages the end of the piston and provides a fluid-tight seal to force fluid out of the pumping chamber, not shown. The movement of the valve in both directions is cushioned by means of the chambers 27 and 28, as indicated, its movement being limited by the rate with which fluid may flow through the restricted ports 29 and 30.

It will be obvious to those skilled in the art that various changes may be made in my device without departing from the spirit of the invention and therefore I do not limit myself to what is described in the specification and shown in the drawings, but only as indicated by the appended claims.

Having thus fully described my said invention, what I claim as new and desire to secure by Letters Patent, is:

1. A valved piston comprising a piston head, a valve seat attached thereto and having axial fluid inlet ports therethrough, a valve on said seat having a depending portion fitting about the periphery of said valve seat, said valve having a sealing ring engageable with the cylinder walls to cause the valve to be moved from and to fluid closing position upon movement of the piston, substantially as set forth.

2. A valved piston comprising a piston head having axial fluid inlet ports therethrough, a valve secured on said head, the valve having means providing axial movement of the valve on the head, said means comprising a ring on the valve engageable with the cylinder wall, a stem on said valve, and means on said stem for providing a cushioning of the axial movements of the valve, substantially as set forth.

3. A valved piston comprising a piston head having fluid ports therethrough, a valve on said head and a drag ring on said valve engagable with the wall of the cylinder to cause it to open and close as the piston is moved in the cylinder, substantially as set forth.

4. A valved piston comprising a piston head having fluid ports therethrough, a valve on said head, a drag ring on said valve engageable with the wall of the cylinder to cause it to open and close as the piston is moved in the cylinder, a valve stem, and means on said valve stem for cushioning the movements of the valve, substantially as set forth.

5. A valved piston comprising a piston head having fluid ports therethrough, a valve mounted on said head and adapted to move axially thereon, a drag ring on said valve frictionally engageable with the sides of the cylinder in which the piston operates to move the valve, a second cylinder and piston formed by the said valve stem and a part of the said piston head adapted to serve as a dash pot to cushion the axial movements of the said valve, substantially as set forth.

6. A valved piston comprising a piston head, a valve seat detachably secured within the said head, the said valve seat having a central port therethrough, a valve having a depending annular ridge adapted to seat upon said valve seat, a drag ring on the periphery of said valve, a plurality of ports through said valve, a screw threaded stem on said valve having a cap secured thereon, the said cap fitting over an annular portion on the valve seat to provide fluid pockets, and a plurality of restricted outlets from said valve pockets whereby the axial movement of said valve will be cushioned in each direction during operation of the compressor, substantially as set forth.

In witness whereof, I have hereunto set my hand at Waynesboro, Pennsylvania, this 18th day of Sept., A. D. nineteen hundred and thirty.

NORMAN M. SMALL.